United States Patent Office 3,089,784
Patented May 14, 1963

3,089,784
POLYESTER COATING SYSTEM
Arthur P. Dowling, Lakewood, Ohio, assignor, by mesne assignments, to Diamond Alkali Company, Cleveland, Ohio, a corporation of Delaware
No Drawing. Filed Mar. 24, 1960, Ser. No. 17,274
2 Claims. (Cl. 117—70)

This invention relates to an improved polyester coating system, to process for applying same to a surface, and more particularly to such system and process wherein a polyester-containing coating material is allowed to set by action of a free radical catalyst contained in a layer thereunder.

Heretofore peroxide catalysts have been incorporated directly into the polyester coating. The rapidity of curing after the catalyst is added limits the working life or "pot life" of the polyester. The instant invention extends the pot life of the polyester resin indefinitely. Furthermore, it provides a rapid and economical way of filling porous or rough surfaces, e.g. masonry surfaces.

Broadly, the process of this invention involves the coating of a masonry article such as concrete block, concrete slab, cinder block, brick, mortar, tile, structural glass, a hard-pressed heavy board made from asbestos and Portland cement called "Transite," or stone with a coating material comprising an unsaturated polyester dissolved in a polymerizing monomer. The improvement to which this invention is specifically directed comprises forming an exposed surface of said article from an aqueous mixture containing hydraulic cement and bearing a free radical catalyst capable of curing said polyester-containing coating material; at least partially curing said aqueous mixture; and thereafter applying the polyester-containing coating material to said surface and allowing it to set by the action of said catalyst in the cured aqueous mixture. The resulting article, therefore, comprises a coating containing unsaturated polyester dissolved in a polymerizable monomer and thereunder the catalyzed hydraulic cement composition.

Preferentially the hydraulic cement composition containing the free radical catalyst is applied to the masonry substrate as a discrete layer and usually after said substrate has been wetted with water to promote good adhesion of the cement. The application can be done by casting, spraying, troweling, or brushing. It is realized that many aqueous cement or cement concrete mixtures will not reach ultimate cure or hardness for a long period of time. However, when they are ostensibly dry or at least have lost sufficient initial plasticity to tolerate brushing or spraying of the polyester, they are adequately cured for my purpose. A substantial amount of free water on their exposed surface will tend to retard the cure of the polyester somewhat, but is otherwise innocuous.

Because free alkaline impurities such as alkaline earth metal oxides and hydroxides and alkali metal hydroxides, as well as active (e.g. free) transition element oxides such as those of iron, manganese, chromium, vanadium, cobalt and the like tend to accelerate destruction of the free radical catalyst in the subcoating, it is especially desirable to use inert fillers which have not more than about 1% of such impurities in them in order to get a reasonably long working life of the catalyst in the subcoat. By transition elements I mean those so designated in the Bohr arrangement of chemical elements that can change in valence. Silicates of iron, etc. do not appear especially active. In some instances the incorporation of a chelating agent such as ethylene diamine tetraacetic acid, gluconic acid, tartaric acid, salts thereof, etc. can be helpful for prolonging the catalytic activity of the cementiferous subcoating. Accordingly, it is advantageous to use hydraulic cements and such inert fillers or aggregates that have the low transition element oxide content, principally iron (measured as iron oxide), and low free lime as specified.

The hydraulic cement can be used neat with water, and this is especially desirable in applying the polyester coating system over old or smooth structures to obtain the greatest bond. Suitable neat cement mixtures are broadly from about 10–50% by weight water and preferably 15–30%. Alternatively, the cement can be made up into a concrete with water and filler or aggregate in conventional fashion, e.g. 1 part of cement per 1–5 parts of water per 2–8 parts of aggregate. Generally the thinner (more aqueous) mixtures are preferred for brushing on thin coats or general working.

For filling pores and levelling out rough masonry surfaces I prefer to use a catalyzed concrete of hydraulic cement, water, and silica sand containing not substantially more than about ½% iron measured as $Fe_2O_3$. Other suitable inert fillers of low iron content that I can employ include asbestos, talc, mica, alumina, diatomaceous earth, "Microballoons" (minute spheres of C stage phenolic resin), barytes, popped perlite, and inorganic pigments, calcium carbonate, coated metal particles, and zeolites.

The use of fillers, of course, extends the subcoating cheaply and those fillers that do not retain much unbound water appear to be superior. I have found that an ordinary grade of untreated pumice, however, is unsatisfactory for my purpose because the catalyst compounded with it decomposes so rapidly that the subcoat is virtually inactive for curing a subsequent polyester topcoating applied a few hours later. I have observed the same phenomenon with ordinary Portland cement mixtures which contain substantially above about 2% free lime. Similarly, carbon black as a filler can do the same thing, although less active grades of carbon, e.g. washed coke, can be tolerated.

Hydraulic cements (low in iron and in free lime) are common, mineral-derived powders which form a settable plastic mixture after having been mixed with water. Rapidly curing cements, e.g. those low in retarders such as gypsum, are usually advantageous for maintaining catalyst activity. Roughly, four to eight ounces of conventional peroxide catalyst solution or dispersion (preferably aqueous) per gallon of aqueous cement mixture for application to the masonry surface usually is adequate to obtain good polyester resin curing thereover, although a greater proportion of catalyst solution, e.g. 10–20 ounces per gallon can be used with advantageous effect in many instances. Suitable hydraulic cements include calcium-aluminate cements, various special proprietary hydraulic cements having quick-setting properties such as "Waterplug" cements, and magnesium oxychloride ("Sorel") cements. Low iron, low free lime Portland cements are also adequate in many instances and, of course, are quite economical.

The cement subcoating can have embedded therein or applied thereover a foraminous membrane for reinforcement or for decorative purposes. Suitable membranes include, for example, a mat or veiling of glass fibers, or unlaid, woven, felted or adhesively united foraminous sheets of natural or synthetic textile fibers which are capable of resisting the solvent action of the polyester-containing topcoating material (e.g. cotton, jute, polyamide, polyester, or acrylic fibers) paper, or metal strands, e.g. of aluminum or other metal (the metal advantageously is resin-coated, as with aromatic solvent-resistant copolymers of vinyl chloride and vinyl acetate, to prevent its causing premature destruction of the catalyst in the subcoating to which it is applied or in which it is embedded).

In a special embodiment of my invention the aqueous cement mixture is cured to form a rigid foamed or aerated layer before applying the polyester-containing coating material. The aeration of the cement undercoating can be done in a number of conventional ways, e.g. by incorporating a controlled amount of aluminum powder into it, or by using various air-entraining agents such as tallow, but avoiding phenolic materials which can inhibit cure of the polyester. The resulting coating system has, thereby, insulation properties and comparatively low density.

The free radical catalysts which are suitable for my purposes are generally and preferably peroxides and hydroperoxides including methyl ethyl ketone peroxide, suitable in solution in a high boiling solvent such as dimethyl phthalate, cyclohexanone peroxide, e.g. that ordinarily sold as a concentrated solution in a suitable plasticizer or in a water dispersion, tertiary butyl hydroperoxide, and hydrogen peroxide, available in aqueous or oraganic solvent solution. I have found unpromoted benzoyl peroxide to be decidedly inferior to the foregoing ones for my purpose, but when promoted with a dialkyl aniline such as dimethyl aniline or diethyl aniline it is satisfactory. In such instance the subcoating can contain the peroxide and the polyester carry the promoter.

The polyester top coating for use in my process generally is pigmented in such manner as to mask the red cast imparted to the polyester when it contains a conventional cobalt drier. Pigmented polyester top coating usually involves the incorporation of white pigments such as titanium dioxide into the polyester-containing coating, although a clear polyester top coating can be used satisfactorily in my coating system. The polyester-containing coating also can have a conventional thixotropic agent in it, e.g. fine silica such as "Cab-o-Sil" or the like, the castor oil derivative "Thixcin," etc.

Suitable polyester resins for the practice of this invention contain ethylenic unsaturation and ordinarily are made by condensing one or more unsaturated organic acids with one or more polyhydric alcohols. The polyester resin is dissolved in a cross-linking agent, for example styrene, divinyl benzene, vinyl toluene, a diallyl ester such as diallyl phthalate or the like. The polyester-polymerizable monomer compositions, which are substantially 100% polymerizable, are conventionally stabilized with inhibitors, e.g. phenolic inhibitors, to enable their being stored for extended periods. Certain of them also have incorporated therein a small amount of paraffin wax or the like to prevent air from inhibiting their cure. Others, notably those of the type shown in U.S. Patent 2,852,487, are not inhibited by contact with air. The polyester-containing coating art is well developed; it is shown at length in my copending U.S. patent application S.N. 663,600, filed June 5, 1957, which is incorporated expressly by reference herein.

The following example shows ways in which my invention has been practiced, is not to be construed as limiting the invention. All parts are parts by weight, and all percentages are weight percentages unless otherwise expressly indicated. Temperatures given are in degrees Fahrenheit. The gloss enamel used in exemplary preparations was formulated by mixing the following components in the proportions indicated (prior to application over the subcoating there was added to this enamel 0.5 oz. per gallon of cobalt curing promoter which was a 12% solution of cobalt octoate in a mixture of 50% butanol and 50% xylene):

Rubber grade styrene _____ pints __ 1
Titania pigment concentrate [1] _____ lbs __ 2.5
Silica gel thixotropic agent _____ lbs __ 0.31
Polyester resin [2] _____ pints __ 7

[1] Compounded of 12 lbs. of pigmentary rutile titania and 8 pints of the following vehicle:
The reaction product of 1.13 mols of propylene glycol, 0.5 mol of maleic anhydride, and 0.5 mol of phthalic anhydride cooked to a maximum temperature of 375° F. in xylene solvent with CO₂ stripping, stripped under reduced pressure to 100% solids, then blended with diallyl phthalate monomer, 4 tertiary butyl catechol stabilizer, and acetamidine hydrochloride stabilizer to give a solution containing 50% of the monomer, 0.01% of the catechol stabilizer, and 0.25% of the acetamidine stabilizer. The acetamidine stabilizer was a solution of one part of acetamidine hydrochloride in 4 parts of propylene glycol.
[2] Compounded of the reaction product of 0.88 mol of propylene glycol, 0.5 mol of succinic anhydride, 0.5 mol of maleic anhydride, and 0.25 mol of the mixed mono-, di-, and triallyl ethers of pentaerythritol (analytically averaging the pure diallyl ether of pentaerythritol and having an 11% hydroxyl content, iodine number of 240, and ash, as sulfate, of 0.18%) which had been cooked in the presence of nitrogen gas and 1% tricresyl phosphate to a maximum temperature of 365° with entrainment of water by xylene solvent, then stripped of solvent with nitrogen gas, cut back with 0.43 part of rubber grade styrene per part of resulting polyester resin, and inhibited (basis polyester resin) with 0.1% p-benzoquinone and 0.25% of a 20% solution of the aforementioned acetamidine hydrochloride in propylene glycol. Viscosity of the resulting mixture was P–R (Gardner-Holdt), acid no. 40±3, polyester content 69% ±1, and weight per gallon 9.14 lbs.

*Example*

A cement grout is made from 2.5 parts of conventional calcium aluminate (hydraulic) cement, 0.9 part of water, and 3.6 parts of wet ground silica sand having particle size between about 50 and 140 mesh (U.S. standard sieve) and 0.04–0.047% iron measured as ferric oxide. Then a peroxide catalyst, cyclohexanone peroxide, as a 50% dispersion in water vehicle is blended with the grout in the proportion of 6 liquid ounces per gallon of grout, and the catalyzed grout applied by brush to the water-wet surface of a concrete block.

The grout is allowed to set by standing overnight at room temperature, then there is painted over it the gloss polyester resin enamel. The enamel cures to a tack-free film resembling a ceramic tile finish.

In a similar experiment, except that the grout is compounded of 4 parts of conventional magnesium oxychloride (Sorel) cement and 1 part of water, the catalyst grout sets in about 30 minutes and is coated with the polyester enamel, which cures to give a similar effect.

I claim:
1. In a process for coating masonry surface with a coating material comprising a solution of unsaturated polyester dissolved in a polymerizable monomer, the improvement which comprises applying to the surface an aqueous mixture containing hydraulic cement and bearing a free radical catalyst capabe of curing said polyester-containing coating material, said hydraulic cement containing not more than about 1% transition element oxide content, measured as iron oxide, and not substantially more than about 2% of free lime, at least partially curing said aqueous mixture to a discrete layer, and thereafter applying said polyester-containing coating material and allowing it to set by the action of said catalyst in said layer.
2. The process of claim 1 wherein the aqueous cement mixture is cured to a rigid aerated layer before applying said polyester-containing coating material.

References Cited in the file of this patent

UNITED STATES PATENTS

| | | |
|---|---|---|
| 2,123,152 | Rivat | July 5, 1938 |
| 2,740,728 | Sonnabend et al. | Apr. 3, 1956 |
| 2,817,619 | Bickel et al. | Dec. 24, 1957 |
| 2,901,377 | Bode | Aug. 25, 1959 |

FOREIGN PATENTS

| | | |
|---|---|---|
| 818,412 | Great Britain | Aug. 19, 1959 |

UNITED STATES PATENT OFFICE
CERTIFICATE OF CORRECTION

Patent No. 3,089,784                                                       May 14, 1963

Arthur P. Dowling

It is hereby certified that error appears in the above numbered patent requiring correction and that the said Letters Patent should read as corrected below.

Column 1, line 28, for "polymerizing" read -- polymerizable --; column 4, line 54, for "capabe" read -- capable --.

Signed and sealed this 29th day of October 1963.

(SEAL)
Attest:

ERNEST W. SWIDER                                          EDWIN L. REYNOLDS

Attesting Officer                                         Acting Commissioner of Patents